(12) United States Patent
Hamashima et al.

(10) Patent No.: US 7,905,386 B2
(45) Date of Patent: Mar. 15, 2011

(54) METHOD FOR AIRTIGHTLY JOINING REINFORCED PLATINUM HOLLOW TUBE WITH PLATINUM FLANGE

(75) Inventors: Kazuo Hamashima, Yokohama (JP); Michito Sasaki, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/884,702

(22) Filed: Sep. 17, 2010

(65) Prior Publication Data

US 2011/0005631 A1    Jan. 13, 2011

Related U.S. Application Data

(60) Division of application No. 11/850,905, filed on Sep. 6, 2007, which is a continuation of application No. PCT/JP2006/302075, filed on Feb. 7, 2006.

(30) Foreign Application Priority Data

Mar. 8, 2005  (JP) ................................. 2005-064100

(51) Int. Cl.
*B23K 9/00*  (2006.01)
(52) U.S. Cl. ...................... 228/135; 428/670; 65/374.12
(58) Field of Classification Search .................. 228/135; 428/670; 65/374.12
See application file for complete search history.

(56) References Cited

U.S. PATENT DOCUMENTS

| | | | |
|---|---|---|---|
| 4,332,073 A | 6/1982 | Yoshida et al. | |
| 5,351,555 A | 10/1994 | Garshelis | |
| 5,557,158 A | 9/1996 | Kanao et al. | |
| 5,851,258 A | 12/1998 | Ando et al. | |
| 6,129,997 A | 10/2000 | Braun et al. | |
| 6,519,828 B1 | 2/2003 | Cook et al. | |

FOREIGN PATENT DOCUMENTS

| | | |
|---|---|---|
| JP | 61-17375 | 1/1986 |
| JP | 1-298031 | 12/1989 |
| JP | 6-298543 | 10/1994 |
| JP | 2817168 | 8/1998 |
| JP | 11-335754 | 12/1999 |
| JP | 2000-302457 | 10/2000 |
| JP | 2001-39720 | 2/2001 |

OTHER PUBLICATIONS

European search report dated Jul. 29, 2010 in Application No. 06713218, 5 pages.
Machine Translation of JP 2000-302457, published Oct. 31, 2000.

*Primary Examiner* — Jessica L Ward
*Assistant Examiner* — Nicholas P D'Aniello
(74) *Attorney, Agent, or Firm* — Oblon, Spivak, McClelland, Maier & Neustadt, L.L.P.

(57) ABSTRACT

The present invention provides a new method for airtightly joining a hollow tube made of a reinforced platinum and a flange made of platinum or a platinum alloy, which prevents decreasing of mechanical strength of the hollow tube made of a reinforced platinum due to its joining with a flange. A method for airtightly joining a hollow tube made of a reinforced platinum with a flange made of platinum or a platinum alloy, which is a method for airtightly joining the outer periphery of a hollow tube made of a reinforced platinum produced by dispersing metal oxides in platinum or a platinum alloy, with a flange made of platinum or a platinum alloy, the method comprising a step of shrink-fitting a ring made of platinum or a platinum alloy to the outer periphery of the hollow tube, a step of heating the hollow tube to which the ring is shrink-fit at from 1,150 to 1,450° C. for from 1 to 10 hours, and a step of welding the flange made of platinum or a platinum alloy to the outer periphery of the ring.

3 Claims, 4 Drawing Sheets

US 7,905,386 B2

METHOD FOR AIRTIGHTLY JOINING REINFORCED PLATINUM HOLLOW TUBE WITH PLATINUM FLANGE

CROSS-REFERENCE TO RELATED APPLICATIONS

The present application is a divisional of U.S. application Ser. No. 11/850,905 filed on Sep. 6, 2007 now U.S. Pat. No. 7,819,303, and is a continuation of PCT/JP06/302075 filed on Feb. 7, 2006, and is based on and claims priority to JP 2005-064100 filed on Mar. 8, 2005, the entire contents of each of which are hereby incorporated herein by reference.

TECHNICAL FIELD

The present invention relates to a method for airtightly joining the outer periphery of a hollow tube made of a reinforced platinum (it is also referred to as "reinforced platinum hollow tube") produced by dispersing a metal oxide into platinum or a platinum alloy, with a flange made of platinum or a platinum alloy, a flanged hollow tube produced by using the method, and a vacuum degassing apparatus employing such a flanged hollow tube.

BACKGROUND ART

In a molten-glass-producing apparatus, hollow tubes made of platinum or a platinum alloy such as platinum-gold or platinum-rhodium for conduit tubes for molten glass such as an uprising pipe or a downfalling pipe of a vacuum degassing apparatus (refer to Patent Document 1). The reason why such hollow tubes made of platinum or a platinum alloy are used for conduit tubes for letting molten glass having a temperature of from 1,100 to 1,500° C. flow through, is not only because these metals have high melting points but also because these materials have low reactivity with molten glass even at high temperature, whereby no inhomogeneity of molten glass due to their reaction with the materials is produced, and their strength at high temperature can be maintained to a certain extent. However, since platinum and platinum alloys are expensive materials, the thickness of the hollow tube is preferably as thin as possible. As a material having both the above-mentioned excellent property of platinum or platinum alloys and mechanical strength, a reinforced platinum produced by dispersing metal oxide particles such as $Al_2O_3$, $ZrO_2$ or $Y_2O_3$ into platinum or a platinum alloy, is starting to be used as a material constituting the hollow tube. In such a reinforced platinum, metal oxide particles dispersed in platinum or a platinum alloy produce an effect of preventing dislocation or movement of grain boundaries, to increase mechanical strength.

Patent Document 1: Japanese Patent No. 2817168

DISCLOSURE OF THE INVENTION

Problems to be Solved by the Invention

Application of a reinforced platinum significantly expands flexibility of structural design of conduit tubes for molten glass. For example, an uprising pipe and a downfalling pipe of a vacuum degassing apparatus made of conventional platinum or platinum alloy, require wall thicknesses of more than 3 mm when they are designed under the assumption that the materials themselves are structural materials producing strength. Accordingly, particularly in a large-sized apparatus, in order to suppress consumption amount of platinum or platinum alloy as noble metals, a refractory material made of a ceramic such as electrocast bricks having heat-resistance, has been used as a structural material, and platinum or a platinum alloy has been employed as its covering material. However, it is a matter of course that shape-flexibility is significantly limited in structural design of conduit tubes so long as fire-resistant refractory materials having no extendibility and hard to be fabricated, are used as structural materials. On the other hand, in cases of uprising pipes and downfalling pipes made of a reinforced platinum, sufficient durability can be obtained by a wall thickness of 1.5 mm or less when these pipes themselves are used as structural materials, which makes the refractory material made of fire-resistant material unnecessary and increases shape flexibility in structural design of conduit tubes.

In a molten-glass-producing apparatus, it is necessary to airtightly join a conduit tube for molten glass with another constituent element of the molten-glass-producing apparatus. Particularly, joining of a conduit tube for molten glass with a constituent element of molten-glass-producing apparatus inside of which is maintained to be in vacuum state, such as joining of an uprising pipe or a downfalling pipe with a vacuum housing of a vacuum degassing apparatus, has to be airtight joining.

In order to airtightly join a hollow tube made of platinum or a platinum alloy with another constituent element of a molten-glass-producing apparatus, a flange made of platinum or platinum alloy is joined to the outer periphery of the hollow tube. A joined portion of such a hollow tube with a flange has to be airtightly joined. Further, at a time of joining such a hollow tube with a constituent element such as a vacuum housing inside of which is maintained to be in a vacuum state, a considerable pressure difference is formed between a vacuum housing side and its opposite side of the flange. The pressure inside the vacuum housing is maintained to be from 0.08 atm (8.10 kPa) to 0.5 atm (50.65 kPa). On the other hand, the pressure outside the vacuum housing is an atmospheric pressure. The pressure difference between these pressures is applied to the flange. The flange needs to have mechanical strength sufficient for bearing this pressure difference. For this reason, the flange made of platinum or platinum alloy is welded to the outer periphery of the hollow tube made of platinum or platinum alloy.

However, when a reinforced platinum is used as the material forming the hollow tube, decreasing of mechanical strength of the welded portion of the hollow tube to the flange is a problem. Namely, when the flange is welded to the hollow tube, the outer periphery of the hollow tube is partially heated to a temperature higher than the melting point of reinforced platinum. Metal oxide dispersed into platinum or a platinum alloy are fine particles having a particle size of a few microns or smaller, and thus, there is a possibility that the particles are agglomerated together when they are heated to such a temperature, which may significantly reduce the number of particles. Further, a part of the metal oxide may be evaporated from the platinum or platinum oxide material at the time of heating. As a result of these phenomena, the effect produced by dispersing metal oxide, namely, the effect of preventing dislocation or movement of grain boundaries, is decreased. Accordingly, mechanical strength of welded portions decreases to prevent obtaining of normal mechanical strength of reinforced platinum. As described above, differently from a conventional conduit tube made of platinum or a platinum alloy, a reinforced platinum conduit tube itself is a structural material, and thus, there has been a problem that when its mechanical strength decreases, a crack is formed at a welded portion by the pressure difference applied to the flange.

To solve the above-mentioned problems of conventional techniques, it is an object of the present invention to provide a method for airtightly joining a hollow tube made of a reinforced platinum with a flange made of platinum or a platinum alloy, whereby deterioration of mechanical strength of the reinforced platinum hollow tube due to joining with the flange is prevented, and to provide a flanged hollow tube produced by using such a method and a vacuum degassing apparatus employing such a flanged hollow tube.

Means for Solving the Problems

In order to achieve the above objects, the present invention provides a method for airtightly joining a hollow tube made of a reinforced platinum with a flange made of platinum or a platinum alloy, which is a method for airtightly joining the outer periphery of a hollow tube made of a reinforced platinum produced by dispersing a metal oxide in platinum or a platinum alloy, with a flange made of platinum or a platinum alloy, the method comprising a step of shrink-fitting a ring made of platinum or a platinum alloy to the outer periphery of the hollow tube, a step of heating the hollow tube to which the ring is shrink-fit at from 1,150 to 1,450° C. for from 1 to 10 hours, and a step of welding the flange made of platinum or a platinum alloy to the outer periphery of the ring.

In the method of the present invention, it is preferred to further provide deposit welding to ends of the joined portion of the hollow tube with the ring shrink-fit to the outer periphery of the hollow tube.

In the method of the present invention, it is preferred to further vacuum-degas a portion between the hollow tube and the ring shrink-fit to the outer periphery of the hollow tube.

Further, the present invention provides a flanged hollow tube produced by the method of the present invention.

Further, the present invention provides a vacuum degassing apparatus employing the flanged hollow tube.

EFFECTS OF THE INVENTION

In the method of the present invention, a flange made of platinum or a platinum alloy is not directly welded to a reinforced platinum hollow tube but welded to a ring made of platinum or a platinum alloy shrink-fit to the outer periphery of the hollow tube, and thus, there is no risk of deteriorating mechanical strength of the reinforced platinum hollow tube due to its joining with the flange. Accordingly, the hollow tube exhibits normal mechanical strength of the reinforced platinum. When the ring made of platinum or a platinum alloy is shrink-fit to the hollow tube and subjected to a heating treatment, the interface between the ring and the hollow tube is partially fused together. Accordingly, the joined portion of the hollow tube with the ring has sufficient joining strength and airtightness.

The flanged hollow tube of the present invention is excellent in mechanical strength since the reinforced platinum hollow tube exhibits its normal mechanical strength, and the joined portion of the hollow tube with the flange is excellent in mechanical strength and airtightness. For this reason, the flanged hollow tube is suitable as a member to be used in a high-temperature environment such as a conduit tube for molten glass used in a molten-glass-producing apparatus, and particularly suitable as a member to be used in a portion requiring airtight joining.

In the vacuum degassing apparatus employing a to flanged hollow tube of the present invention, a ring is interposed between a hollow tube and a flange, which reduces the risk of crack at the joining portion of these members. Accordingly, the vacuum degassing apparatus is excellent in reliability.

EXPLANATION OF NUMERALS

Figure 1:
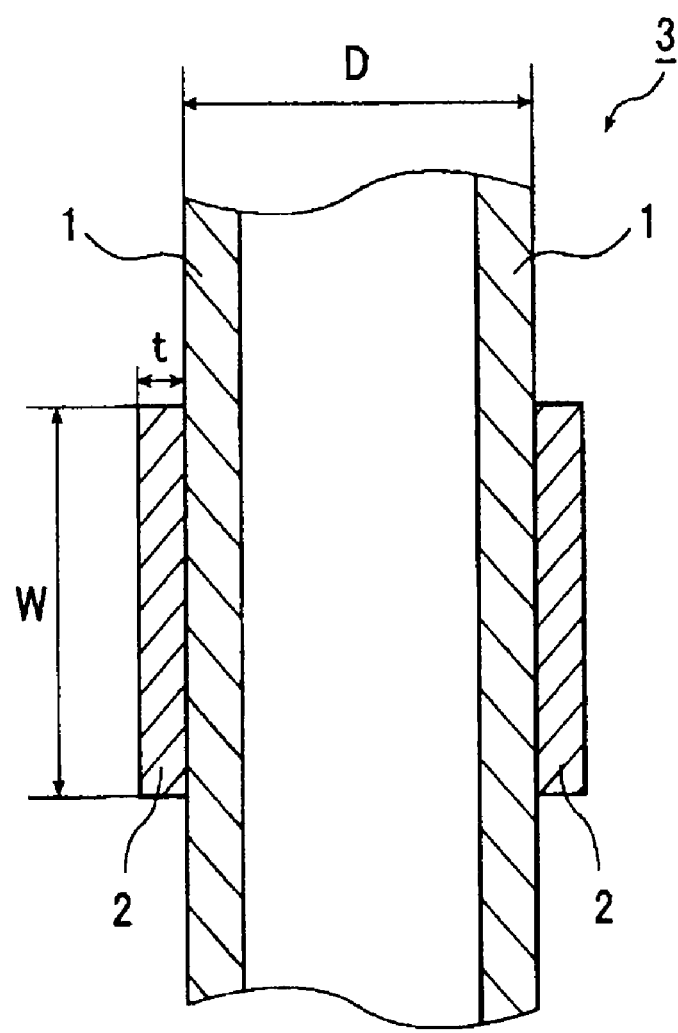
FIG. 1 is a partial cross-sectional view showing a reinforced platinum hollow tube and a platinum ring that are shrink-fit together.

1: Hollow tube
2: Ring
3, 3': Structure
4: Flange
5: Tube for vacuum degassing
10: Welded portion
20: Deposit welding

BEST MODE FOR CARRYING OUT THE INVENTION

The method of the present invention is further described with reference to drawings.

In the method of the present invention, a reinforced platinum hollow tube and a flange made of non-reinforced platinum or a platinum alloy are not directly welded to be joined, but they are joined via a ring made of platinum or a platinum alloy. Here, in this specification, reinforced platinum means a reinforced platinum formed by dispersing a metal oxide in platinum or a platinum alloy. The metal oxides are oxides of a metal of Group III, IV or XIII in the Periodic Table (IUPAC (1989)) exemplified by $Al_2O_3$, $ZrO_2$ or $Y_2O_3$. Further, as a specific example of platinum alloy, platinum-gold alloy or platinum-rhodium alloy are mentioned. Hereinafter, in this specification, "made of platinum" means both of "made of platinum" and "made of a platinum alloy".

In the method of the present invention, first of all, a ring made of platinum (it is also referred to as "platinum ring") is shrink-fit to the outer periphery of a reinforced platinum hollow tube. The shrink-fitting of a platinum ring can be carried out by a common procedure. Namely, a platinum ring is prepared, which has an inner diameter smaller than the outer diameter of the reinforced platinum hollow tube at a room temperature. The ring is heated to be thermally-expanded until the inner diameter of the ring becomes larger than the outer diameter of the hollow tube. In this state, the hollow tube is inserted into a ring. In a state that the ring is disposed at a desired position on the outer periphery of the hollow tube, specifically, at a position to be joined with a flange, the temperature of the ring is lowered to let the ring shrink to complete the shrink-fitting step.

The dimensions of the platinum ring to be shrink-fit, are appropriately selected depending on the dimensions of the reinforced platinum hollow tube. Here, the dimensions of the reinforced platinum hollow tube are appropriately selected according to requirements, and specifically, for example, as follows:

outer diameter: 50 to 800 mm, more preferably 100 to 600 mm, length: 200 to 3,000 mm, more preferably 400 to 1,500 mm, and wall thickness: 0.4 to 5 mm, more preferably 0.8 to 4 mm.

Here, the cross-sectional shape of the hollow tube is usually a perfect circle, but it is not limited thereto, and it may be an ellipse or a polygon such as quadrangle, hexagon or octagon. In the case of polygon, a polygon of more than quadrangle is preferred, and particularly, a shape having rounded corners is preferred.

Here, provided that the outer diameter of the hollow tube is D, the inner diameter of the ring is preferably from 0.001 D to 0.004 D smaller than D. When the difference between these members is within the above range, shrink-fitting operation is easy, and after the shrink-fitting, a flange is sufficiently fixed to the outer periphery of the hollow tube by a solid phase diffusion to be described later. The difference between these members is preferably from 0.002 D to 0.003 D.

The wall thickness t of the platinum ring is preferably smaller than the wall thickness of the reinforced platinum hollow tube, and is preferably about from 0.3 to 2 mm. When the wall thickness of the platinum ring is within the above range, shrink-fitting operation is easy and the joined portion of the reinforced platinum hollow tube with a flange made of platinum (it is also referred to as "platinum flange") has sufficient mechanical strength. Further, airtight joining becomes possible.

Since a platinum flange is welded to the outer periphery of the platinum ring, the platinum ring has to have sufficient width for the welding. However, if the width of the ring is too large, shrink-fitting force tends to be uneven when the ring is shrink-fit, and a bubble tends to remain between the ring and the hollow tube. For this reason, the width w of the platinum ring is preferably about from 15 to 100 mm.

FIG. 1 is a partial cross-sectional view showing a reinforced platinum hollow tube 1 and a platinum ring 2 that are shrink-fit. In the method of the present invention, the structure 3 (hollow tube 1 and ring 2) shown in FIG. 1 is subjected to a heat treatment at from 1,150 to 1,500° C. for from 0.5 to 10 hours. This heat treatment is preferably carried out in an atmosphere containing oxygen, and is usually carried out in the atmospheric air. Accordingly, the heat treatment is achieved by placing the structure 3 shown in FIG. 1 in a heating furnace and heating it under the above conditions. The heat treatment is preferably carried out at from 1,200 to 1,450° C., more preferably at from 1,250 to 1,400° C. Further, the treatment is preferably carried out for from 1 to 5 hours, more preferably for from 2 to 4 hours.

Since the hollow tube 1 and the ring 2 are each made of a platinum material, a solid phase diffusion occurs at the interface between these members by the heat treatment, which causes an effect similar to diffusion joining to partially fuse together these members. Accordingly, the hollow tube 1 and the ring 2 are airtightly and firmly joined. Under the above heat treatment conditions, the hollow tube 1 and the ring 2 can be joined airtightly and firmly.

In the method of the present invention, in order to increase adhesiveness between the hollow tube 1 and the ring 2, a rolling process may be applied to the upper end portion and the lower end portion of the ring 2 before carrying out the heating treatment. Specifically, a roll made of metal is pressed against the upper end portion and the lower end portion of the ring 2, namely, against end portions of the joined portion of the hollow tube with the ring, and in this state, the ring 2 is rotated a few revolutions to apply a load to entire outer periphery of the ring 2, to increase adhesiveness between the hollow tube 1 and the ring 2.

Figure 2:
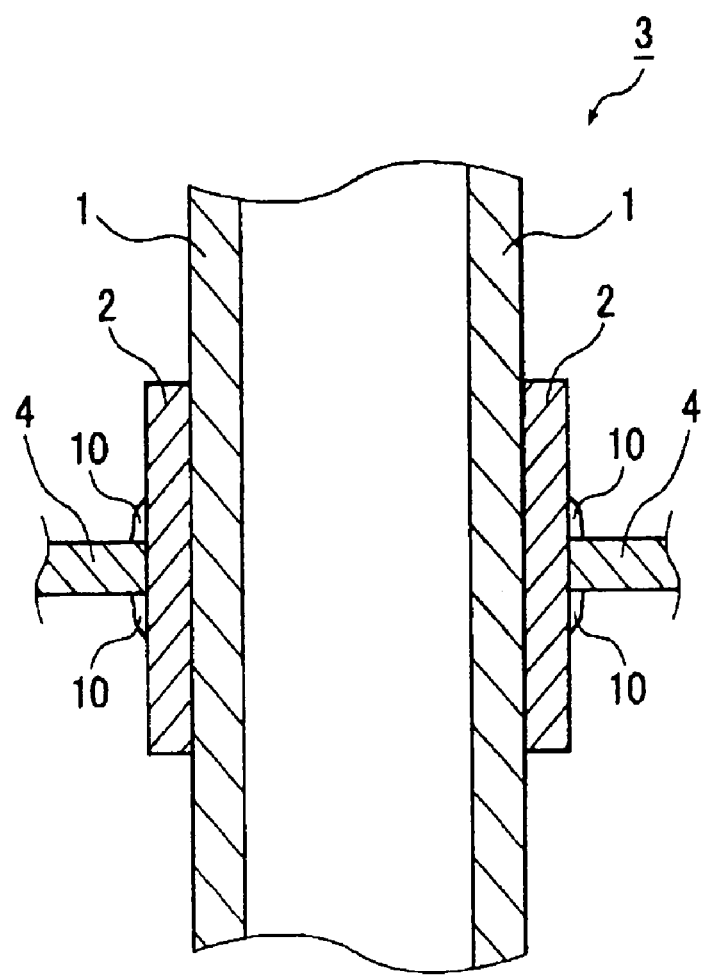
FIG. 2 is a partial cross-sectional view showing a structure in which a platinum flange is welded to the outer periphery of a ring.

In the method of the present invention, the structure 3 shown in FIG. 1 is subjected to the heating treatment under the above-mentioned conditions, and thereafter, a platinum flange 4 is welded 10 to the outer periphery of the ring 2. FIG. 2 is a partial cross-sectional view showing the structure 3 after the platinum flange 4 is welded to the outer periphery of the ring 2. By welding the flange 4 to the outer periphery of the ring 2, the reinforced platinum hollow tube 1 and the platinum flange 4 are airtightly joined via the platinum ring 2. Here, since the welding 10 of the flange 4 to the outer periphery of the ring 2 is a welding between non-reinforced normal platinum materials, and thus, the welding can be carried out in the same process and conditions as those of conventional welding of a platinum hollow tube to a platinum flange.

The shape of flange 4 is not particularly limited so long as it can be welded to the outer periphery of the ring 2 and it enables to airtightly join the hollow tube 1 with another constituent element of a molten-glass-producing apparatus. The shape of the flange 4 is usually a doughnut shape having a hole at the center and a disk-shaped outer shape, but the shape of the flange 4 is not limited thereto, and it may be another shape. For example, its outer shape may be an ellipse, a rectangle, a hexagon, an octagon etc. so long as it has a hole at the center. Here, the dimensions of the flange 4 can be appropriately selected according to the requirement. For example, the inner diameter of the flange 4 can be optionally selected according to the outer diameter of the hollow tube 1, more accurately, according to the outer diameter of the ring 2. Further, the outer diameter of the flange 4 can be optionally selected according to the object (constituent element of a molten-glass-producing apparatus such as a vacuum housing) to be airtightly joined via the flange 4. The wall thickness of the flange 4 is preferably from 0.5 to 8 mm mainly from the viewpoint of strength and cost, more preferably from 1 to 5 mm.

Figure 3:
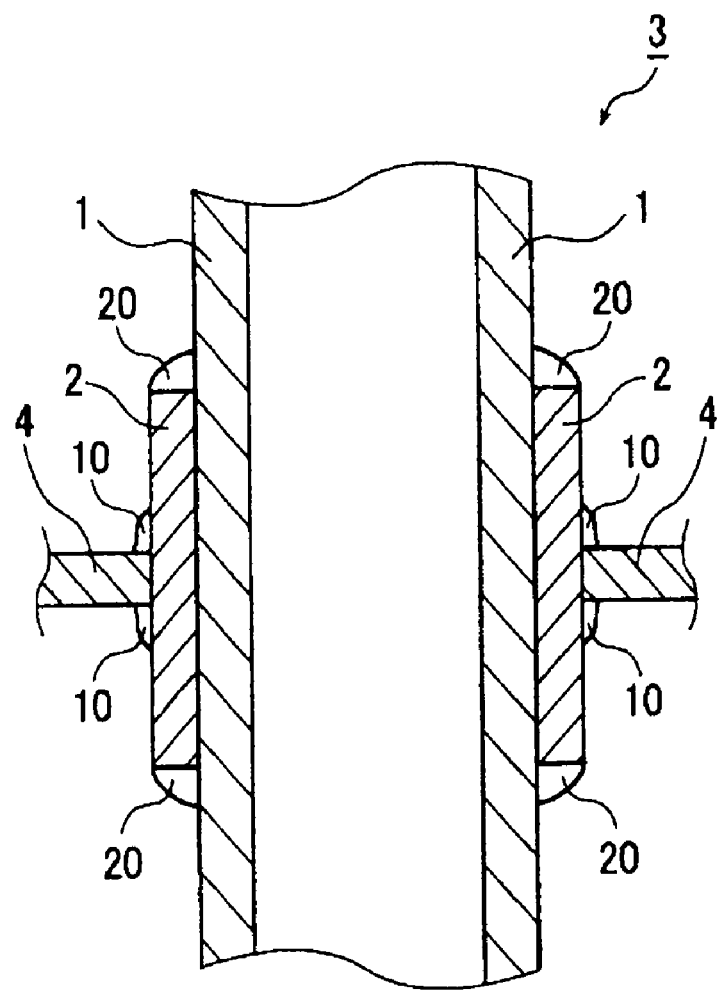
FIG. 3 is a partial cross-sectional view showing a structure in which deposit welding is applied to ends of a joined portion of the hollow tube with the ring.

In the method of the present invention, in order to further increase airtightness at the joined portion of the hollow tube 1 with the ring 2 in the state shown in FIG. 2, deposit weldings 20 may be provided to the ends (upper and lower ends) of the joined portion of the hollow tube 1 with the ring 2. FIG. 3 is a partial cross-sectional view showing the structure 3 after deposit weldings are provided to the joined portion. Here, when the deposit welding is carried out, it is necessary to carry it out under the condition that do not grow crystal grains significantly in the reinforced platinum being a matrix material constituting the hollow tube 1.

Figure 4:
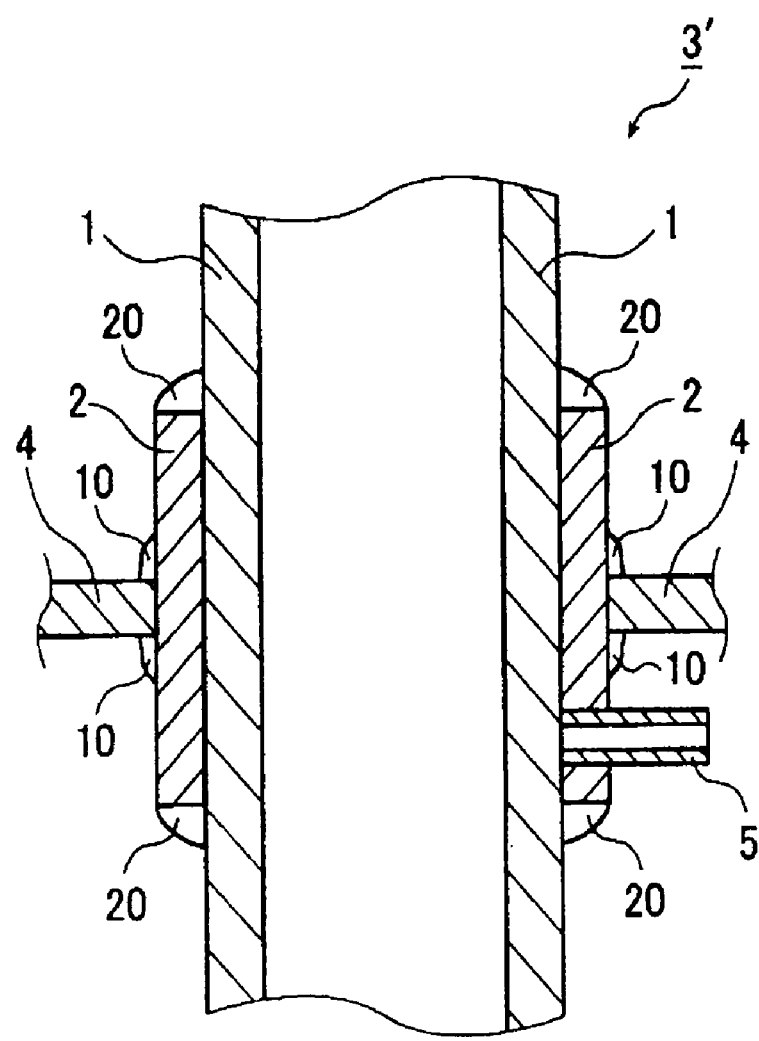
FIG. 4 is a view similar to FIG. 3. However, the structure of FIG. 4 has a platinum tube for vacuum-degassing the joined portion of the hollow tube with the ring.

In the method of the present invention, in order to increase airtightness of the joined portion of the hollow tube 1 with the ring 2 in the state shown in FIG. 3, a portion between the hollow tube 1 and the ring 2, namely the joined portion of these members, may be vacuum-degassed. FIG. 4 is a view similar to FIG. 3. However, the structure 3' of FIG. 4 has a platinum tube 5 for vacuum-degassing the joined portion of the hollow tube 1 with the ring 2. As shown in FIG. 4, the tube 5 perforates through the ring 2, and its one end projects from the outer periphery of the ring 2 so that it can be connected with a vacuum pump. The other end of the tube 5 is present at the interface between the ring 2 and the hollow tube 1. Here, the tube 5 is preferably formed integrally with the ring 2 in advance prior to shrink-fitting, or the tube 5 is preferably attached to the ring 2 in advance.

In the state shown in FIG. 4, the tube 5 is connected to the vacuum pump to vacuum-degas the joined portion of the hollow tube 1 with the ring 2. Accordingly, air remaining between the hollow tube 1 and the ring 2 is exhausted, and these members are more airtightly joined. The conditions of vacuum-degassing the joined portion of the hollow tube 1 with the ring 2 are not particularly limited, and the conditions are appropriately selected according to the dimensions of structure 3' such as the diameter of the hollow tube 1, the diameter, the wall thickness or the width of the ring 2, conditions of shrink-fitting or the degree of deposit weldings 20. Specifically, for example, vacuum degassing is carried out at a vacuum degree of at most $1 \times 10^{-2}$ Pa, preferably from $1 \times 10^{-3}$ Pa to $1 \times 10^{-5}$ Pa (indication by the vacuum pump) for at least 30 minutes, preferably from 60 minutes to 180 minutes.

A flanged hollow tube obtained by the above process is also provided by the present invention. The flanged hollow tube of the present invention is suitable as a member to be used under high-temperature environment such as a conduit tube for molten glass to be used for a molten-glass-producing apparatus, particularly as a member to be used for a portion requiring airtightness.

As a suitable application of the flanged hollow tube of the present invention, an uprising pipe and a downfalling pipe of a vacuum degassing apparatus are mentioned. Here, the flanged hollow tube of the present invention may also be used as e.g. a flow-out pipe provided to remove impurities from a glass-producing apparatus, or a flow-out pipe for flowing out molten glass from a glass-producing apparatus to a molding mold at times of molding the glass into optical components such as lenses or prisms.

Here, the present invention also provides a vacuum degassing apparatus employing the flanged hollow tube. In the vacuum degassing apparatus, the flanged hollow tube is mainly suitably used as a suction port for molten glass in an uprising pipe or a downfalling pipe. Here, the application is not limited thereto, but the flanged hollow tube of the present invention may be used for a joining portion of conduit tubes for molten glass.

Particularly, when the flanged hollow tube is mainly used as a suction port for molten glass in an uprising pipe or a downfalling pipe in a vacuum degassing apparatus, the hollow tube requires a material having high mechanical strength such as a reinforced platinum since molten glass of extremely high temperature flows through the hollow tube, but the flange requires non-reinforced normal platinum material for the reason of easiness of fabrication. The flanged hollow tube of the present invention is excellent in a point that two different platinum materials that are hard to be welded together can be airtightly joined without requiring welding. Further, in the vacuum degassing apparatus, joining of platinum needs to have airtightness for the requirement of evacuating a vacuum degassing vessel into vacuum state, and for this purpose, the flanged hollow is tube of the present invention is suitable since it has sufficient airtightness.

EXAMPLES

The present invention is further described with reference to the following examples.

Example of the Present Invention

In this example, an uprising pipe of a vacuum degassing apparatus is produced by using the method of the present invention.

To the outer periphery of a hollow tube (outer diameter D: 170.5 mm, wall thickness: 1.5 mm) made of a reinforced platinum (platinum-rhodium alloy (90 mass % of platinum and 10 mass % of rhodium) with 0.16 mass % of $ZrO_2$ particles dispersed therein), a ring (inner diameter: 170.2 mm, wall thickness t: 0.6 mm, and width w: 60 mm) made of a platinum-rhodium alloy (90 mass % of platinum and 10 mass % of rhodium) was shrink-fit. To the ring, a platinum tube for vacuum degassing was attached in advance. Subsequently, the hollow tube was put into a heating furnace and subjected to a heating treatment at 135° C. for 5 hours. The hollow tube was taken out from the heating furnace, and to the outer periphery of the ring, a doughnut-shaped flange (outer diameter: 850 mm, inner diameter: 172 mm, wall thickness: 5 mm) made of platinum-rhodium alloy (90 mass % of platinum and 10 mass % of rhodium) was welded. Thereafter, using platinum as a welding material, a deposit welding was applied to ends (upper end and lower end) of the joined portion of the hollow tube with the ring. Subsequently, a vacuum pump (rotary pump) was connected to a tube for vacuum degassing, and the connecting portion of the hollow tube with the ring was vacuum-degassed at a vacuum degree of $1 \times 10^{-3}$ Pa (indication at the vacuum pump) for 60 minutes, followed by cutting the tube for vacuum degassing and sealing the cut surface to obtain an uprising pipe of a vacuum degassing apparatus.

The uprising pipe obtained in the above process was installed in a vacuum degassing apparatus, and the vacuum degassing apparatus was operated under normal operation conditions. The conditions were specifically as follows:
pressure in the vacuum housing: 300 mmHg (40 kPa), and
temperature of uprising pipe: changed cyclically between 1,200 and 1,400° C.

The uprising pipe was placed under the above conditions for 500 hours, and it was confirmed that no crack was observed in the connecting portion of the hollow tube with the flange. Further, the vacuum was maintained normally.

Comparative Example

To the outer periphery of a hollow tube (outer diameter D: 170.5 mm, wall thickness: 1.5 mm) made of a reinforced platinum (a platinum-rhodium alloy (90 mass % of platinum and 10 mass % of rhodium) with 0.16 mass % of $ZrO_2$ particles dispersed therein), a doughnut-shaped flange (outer diameter: 850 mm, inner diameter: 172 mm, wall thickness: 5 mm) made of a platinum-rhodium alloy (90 mass % of platinum and 10 mass % of rhodium) was welded to obtain an uprising pipe of a vacuum degassing apparatus.

The uprising pipe obtained in the above process was installed in a vacuum degassing apparatus, and the vacuum degassing apparatus was operated under normal operation conditions. The conditions at this time was specifically as follows:
pressure in the vacuum housing: 300 mmHg (40 kPa), and
temperature of the uprising pipe: changed cyclically between 1,200 and 1,400° C.

The uprising pipe was placed under the above conditions for 500 hours, and it was confirmed that cracks were observed at the connecting portion of the hollow tube with the flange. Due to these cracks, it was difficult to maintain vacuum normally.

INDUSTRIAL APPLICABILITY

The present invention can be applied to a method for airtightly joining a flange made of platinum or a platinum alloy to the outer periphery of a hollow tube made of a reinforced platinum produced by dispersing a metal oxide in platinum or in a platinum alloy, and a is flanged hollow tube produced by the method is suitably applicable to e.g. a vacuum degassing apparatus of a glass-producing apparatus.

The entire disclosure of Japanese Patent Application No. 2005-064100 filed on Mar. 8, 2005 including specification, claims, drawings and summary is incorporated herein by reference in its entirety.

What is claimed is:

1. A flanged hollow tube produced by using a method for airtightly joining a hollow tube made of a reinforced platinum with a flange made of non-reinforced platinum or non-reinforced platinum alloy, which is a method for airtightly joining the outer periphery of a hollow tube made of a reinforced platinum produced by dispersing metal oxides in platinum or a platinum alloy, with a flange made of non-reinforced platinum or a non-reinforced platinum alloy, the method comprising:

shrink-fitting a ring made of non-reinforced platinum or a non-reinforced platinum alloy to the outer periphery of the hollow tube;

heating the hollow tube to which the ring is shrink-fit at from 1,150 to 1,450° C. for from 1 to 10 hours; and welding the flange made of non-reinforced platinum or a non-reinforced platinum alloy to the outer periphery of the ring.

2. The flanged hollow tube according to claim 1, which is used for a suction port for molten glass in an uprising pipe and/or a downfalling pipe of a vacuum degassing apparatus.

3. A vacuum degassing apparatus comprising the flange hollow tube as defined in claim 1.

* * * * *